United States Patent
Mangal et al.

(10) Patent No.: US 11,354,692 B2
(45) Date of Patent: Jun. 7, 2022

(54) SYSTEM AND METHOD FOR KEEPING AN AUTOMATED-TAXI CLEAN

(71) Applicant: Motional AD LLC, Boston, MA (US)

(72) Inventors: Nandita Mangal, Palo Alto, CA (US); Michael H. Laur, Mission Viejo, CA (US)

(73) Assignee: Motional AD LLC, Boston, MA (US)

( * ) Notice: Subject to any disclaimer, the term of this patent is extended or adjusted under 35 U.S.C. 154(b) by 461 days.

(21) Appl. No.: 16/054,563

(22) Filed: Aug. 3, 2018

(65) Prior Publication Data

US 2020/0043030 A1 Feb. 6, 2020

Related U.S. Application Data

(60) Provisional application No. 62/713,113, filed on Aug. 1, 2018.

(51) Int. Cl.
| | |
|---|---|
| *G06Q 30/00* | (2012.01) |
| *G06Q 30/02* | (2012.01) |
| *G06Q 50/30* | (2012.01) |
| *G06V 20/59* | (2022.01) |
| *G05B 19/418* | (2006.01) |

(52) U.S. Cl.
CPC ..... *G06Q 30/0208* (2013.01); *G06Q 30/0284* (2013.01); *G06Q 50/30* (2013.01); *G06V 20/59* (2022.01)

(58) Field of Classification Search
CPC ........... G06Q 30/0208; G06Q 30/0284; G06Q 50/30; G06K 9/00832; B60S 3/008; G07B 15/02; G06T 7/20–292
See application file for complete search history.

(56) References Cited

U.S. PATENT DOCUMENTS

| | | | | |
|---|---|---|---|---|
| 9,978,249 | B1* | 5/2018 | Mu | G08B 21/24 |
| 2004/0260470 | A1* | 12/2004 | Rast | G06Q 10/083 |
| | | | | 701/300 |
| 2006/0120565 | A1* | 6/2006 | Belau | B60R 21/01538 |
| | | | | 382/107 |
| 2016/0284137 | A1* | 9/2016 | Levy | G06Q 20/32 |
| 2016/0301698 | A1 | 10/2016 | Katara et al. | |
| 2016/0332535 | A1 | 11/2016 | Bradley et al. | |

(Continued)

OTHER PUBLICATIONS

"Smartphone Sensing Meets Transport Data: A Collaborative Framework for Transportation Service Analytics". IEEE Transactions on Mobile Computing. 2018. (Year: 2018).*

(Continued)

*Primary Examiner* — Maria V Vanderhorst
(74) *Attorney, Agent, or Firm* — Fish & Richardson P.C.

(57) ABSTRACT

A system for keeping an automated-taxi clean includes a perception-sensor, a communication-device, and a controller-circuit. The perception-sensor is operable to detect an object aboard an automated-taxi. The communication-device is operable to communicate with a present-client of the automated-taxi. The controller-circuit is in communication with the perception-sensor and the communication-device. The controller-circuit is configured to determine that the object was left by a prior-client of the automated-taxi, and operate the communication-device to convey to the present-client a cleaning-request to remove the object from the automated-taxi.

20 Claims, 3 Drawing Sheets

(56) References Cited

U.S. PATENT DOCUMENTS

| | | |
|---|---|---|
| 2018/0075565 A1 | 3/2018 | Myers et al. |
| 2019/0095725 A1* | 3/2019 | Kalghatgi .......... G06K 9/00791 |
| 2019/0197325 A1* | 6/2019 | Reiley .................... G06Q 10/06 |

OTHER PUBLICATIONS

European Search Report for Application No. EP19189328, European Patent Office, dated Dec. 2, 2019.

* cited by examiner

SYSTEM AND METHOD FOR KEEPING AN AUTOMATED-TAXI CLEAN

TECHNICAL FIELD OF INVENTION

This disclosure generally relates to keeping an automated-taxi clean, and more particularly relates to determining that the object was left by a prior-client of the automated-taxi, and operating a communication-device to convey to a present-client a cleaning-request to remove the object from the automated-taxi or otherwise assist to clean the automated-taxi.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
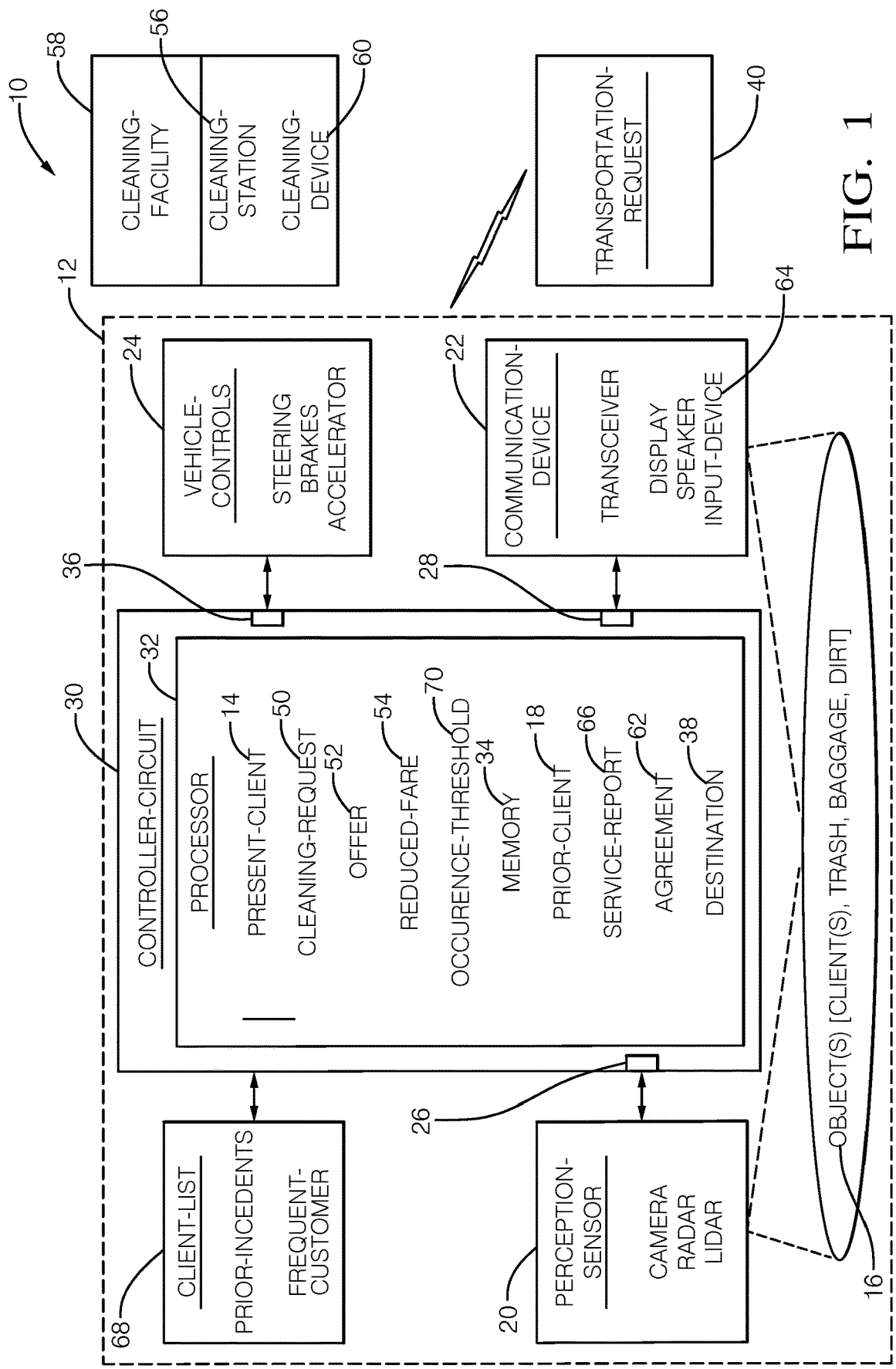
FIG. 1 is a diagram of a system for keeping an automated-taxi clean in accordance with one embodiment.

FIG. 1 illustrates a non-limiting example of a system 10 for keeping an automated-taxi 12 clean. By way of a non-limit example, the system 10 may request a present-client 14 to remove an object 16 left behind by a prior-client 18. The automated-taxi 12 may be characterized as an automated vehicle, and may be referred to by some as an automated-mobility-on-demand (AMOD) type of vehicle. As used herein, the term automated vehicle generally applies to instances when the automated-taxi 12 is being operated in an automated-mode, i.e. a fully autonomous mode, where there is no human-driver, and a client (e.g. the present-client 14 and/or the prior-client 18) of the automated-taxi 12 may do little more than designate a destination to operate the automated-taxi 12. However, full automation is not an absolute requirement. It is contemplated that the teachings presented herein are useful when the automated-taxi 12 is operated in a manual-mode where the degree or level of automation may be little more than automation attempting to engage the clients to help keep the automated-taxi 12 clean. As used herein, the phrase "keep the automated-taxi 12 clean" is generally directed to keeping the interior of the automated-taxi 12 free of, but not limited to, trash (e.g. empty food wrappers or beverage bottles), excessive dirt from the shoes of the clients, food/beverage spills, and/or vomit. The interior of the automated-taxi 12 may include the area where the clients sit or stand while being transported by the automated-taxi 12 and/or a trunk area where luggage or other baggage may be stored/secured for transport.

The system 10 includes a perception-sensor 20 operable to detect the object 16 or objects 16 aboard an automated-taxi 12. The object 16 or the objects 16 may include, but are not limited to, instances of clients (e.g. the present-client 14 and/or the prior-client 18) of the automated-taxi 12, trash, baggage (e.g. one or more shopping bags), luggage, trash, dirt, vomit. etc. The perception-sensor 20 may consist of or include one or more various devices such as, but is not limited to, one or more instances of a camera, lidar, radar, weigh sensor, ultrasonic transducer, or any combination thereof, as will be recognized by those in the object detection arts. The one or more devices that make up the perception-sensor 20 may be co-located in a shared housing or distributed about the cabin and/or trunk area of the automated-taxi 12.

The system 10 includes a communication-device 22 operable to communicate with any or all clients including the present-client 14 and/or the prior-client 18 if he/she is still aboard or proximate to the automated-taxi 12. The communication-device 22 may consist of or include one or more various devices such as, but is not limited to, one or more instances of a speaker, a display (e.g. general-purpose or reconfigurable), and/or a transceiver configured to communicate with a smartphone of any of the clients. As will be explained in more detail below, the communication-device 22 may be used to convey a message or information to any one or more of the clients regarding, but not limited to, keeping the automated-taxi 12 clean.

The system 10 includes vehicle-controls 24 operable to drive, i.e. control movement of, the automated-taxi 12 by operating, for example, the steering, brakes, and accelerator of the automated-taxi 12. The vehicle-controls 24 may be only operable by automation, i.e. there may be no hand-wheel or pedals by which a human-driver could manually control or over-ride the autonomous (i.e. driverless) operation of the automated-taxi. However, this is not a requirement. The vehicle-controls 24 may include some form of means for manual control, a joy-stick for example that could be used in certain (e.g. emergency or vehicle-service) situations to manually steer and/or stop the automated-taxi 12.

The system 10 includes a controller-circuit 30 in communication with the perception-sensor 20 via an input 26 and the communication-device 22 via an output 28. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The controller 30 may also be in communication with the vehicle-controls 24 via a port 36, i.e. data-port or input/output port.

The communication with the perception-sensor 20, the communication-device 22 and the vehicle-controls 24 may be by way of, but not limited to, wires, optical-fiber, and/or wireless communications, as will be recognized by those in the art. The controller-circuit 30 may be is configured to operate the vehicle-controls 24 to drive the automated-taxi 12 to a destination 38 of the present-client 14, which may have been communicated to the controller 30 or the processor 32 by way of a transportation-request 40 sent by the present-client 14 via, for example, a text message or a web-site managed by owners of the automated-taxi 12.

Figure 2:
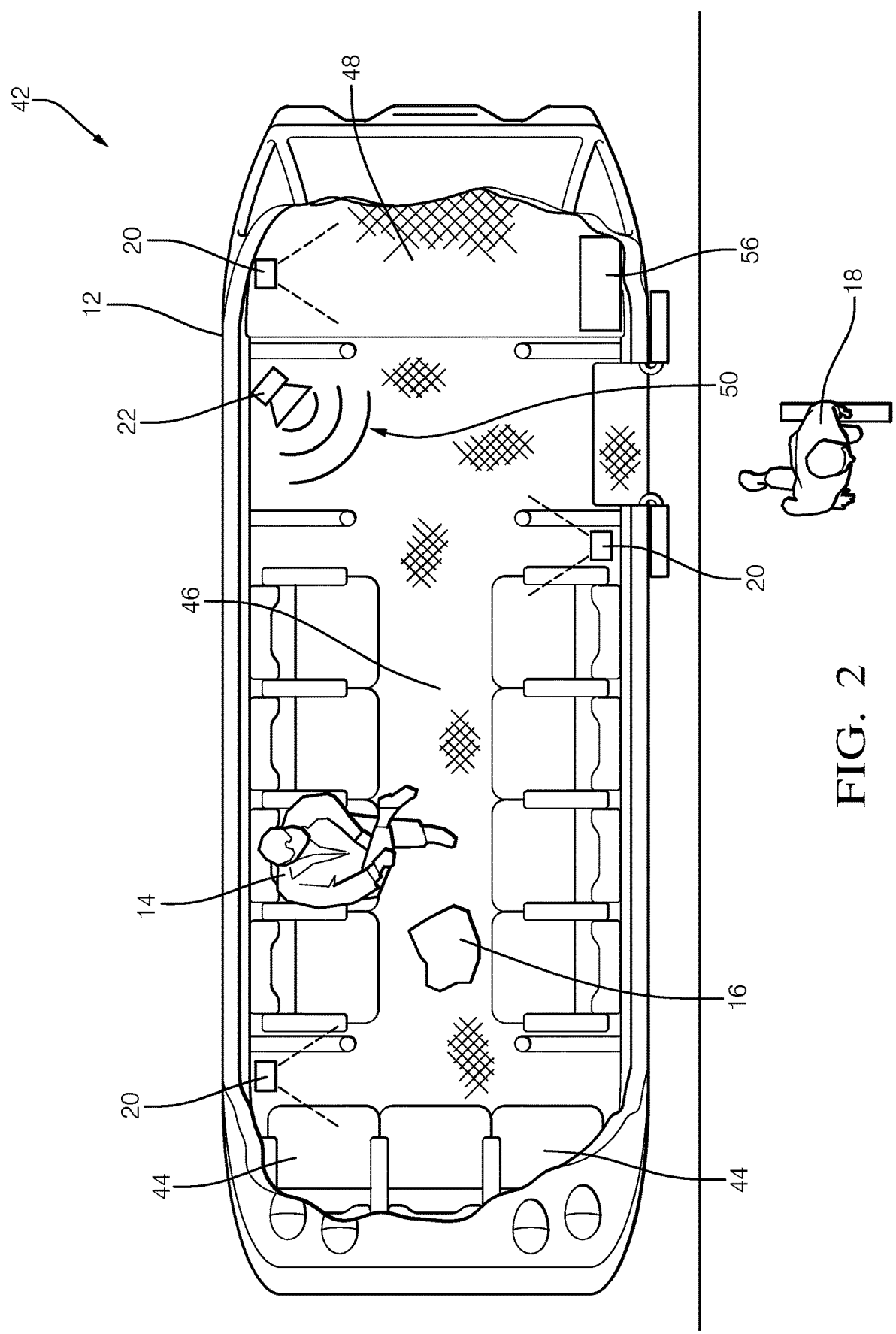
FIG. 2 is a scenario encountered by the system of FIG. 1 in accordance with one embodiment.

FIG. 2 illustrates a non-limiting example of a scenario 42 where the present-client 14 is being transported by the automated-taxi 12 to the destination 38 (not shown in FIG. 2), the prior-client 18 has recently exited the automated-taxi 12, and the prior-client 18 has left behind the object 16, e.g. a food-wrapper or bag from a take-out restaurant. The perception-sensor 20 in this non-limiting example includes multiple cameras that have a view of the seats 44, the floor 46 and a cargo-area 48. The controller 30 (or the processor 32) tracks the objects 16 (e.g. clients and inanimate objects) as they are brought on-board the automated-taxi 12 using algorithms like those used to track targets (e.g. other-vehicles, not shown) for the operation of autonomous or driverless vehicles.

Continuing to refer to FIGS. 1 and 2, the controller-circuit 30 is configured to determine that the object 16 was left by a prior-client 18 of the automated-taxi 12 based on data/information/signals/images from the perception-sensor 20. As suggested above, known target tracking algorithms for camera/radar/lidar may be used to track the prior-client 18 when the automated-taxi 12 is initially boarded by the prior-client 18, and would track the appearance of a new target such as the object 16 when the prior-client 18 leaves the automated-taxi 12 and leaves behind the object 16, e.g. an empty food bag.

In FIG. 2 the present-client 14 appears to be already on board the automated-taxi 12 when the prior-client 18 leaves leaving behind the object 16. However, this is not a requirement. For example, the automated-taxi 12 may be empty of any clients when the present-client 14 boards the automated-taxi 12, and the object 16 is already present. That is, it is anticipated that the present-client 14 may never see the prior-client 18, but the object 16 is already present in the automated-taxi 12 when the present-client 14 boards the automated-taxi 12.

The controller-circuit 30 (or the processor 32) is configured to operate the communication-device 22, which may be a speaker as suggested in FIG. 2, to convey to the present-client 14 a cleaning-request 50 to remove the object 16 from the automated-taxi 12. For example, the speaker may emit the cleaning-request 50 such as—"Please remove the object on the floor from this vehicle and place it in a suitable trash receptacle." Alternatively, the cleaning-request 50 may be displayed on a display (not shown) within the automated-taxi 12 and viewable by the present-client 14, or a text message may be sent to a smart-phone (not shown) carried by the present-client 14. It is contemplated that the cleaning-request 50 may be a request to do something other than remove the object 16, non-limiting example of which are described later in this document.

It is recognized that some clients (people) will respond positively to the cleaning-request 50 because it is the nature of some people to be cooperative. However, it is also recognized that some people only respond to an incentive, such as paying a client to remove trash (e.g. the object 16 in FIG. 2) left by others. Accordingly, in one embodiment, the cleaning-request 50 may include an offer 52 to reduce a fare (the reduced-fare 54) paid by the present-client 14 for transportation by the automated-taxi 12 in exchange for removing the object 16. The offer 52 may be a direct reduction in the fare paid for the instant trip, or for example, an award of points towards free travel at some future date, a coupon for free coffee at some participating retailer, or a material good such as a free toaster.

In another scenario, the problem (i.e. the object 16) may be, for example, a spilled-drink or dirt from shoes. The system 10 (i.e. the controller 30 or the processor 32) may be configured so the cleaning-request 50 is directed at cleaning the spilled-drink or dirt, and the cleaning-request 50 may include an offer 52 for doing so. To this end, the system 10 may include a cleaning-station 56 that may be built into the automated-taxi 12 as suggested in FIG. 2, or located at a cleaning-facility 58 on or near the route to the destination 38 of the present-client 14. The cleaning-station 56 may be equipped with a cleaning-device 60 such as, but not limited to, a container of spray cleaner, paper-towel dispenser, a vacuum-cleaner, or any combination thereof. As suggested above, the cleaning-request that requests that the present-client 14 make appropriate use of the cleaning-device may include an offer 52 to reduce a fare paid by the present-client 14 for transportation by the automated-taxi 12 in exchange for cleaning the automated-taxi 12. the act of cleaning may include, for example using spray-cleaner and paper-towels to clean a spilled-drink from one or more of the seats 44, or operating a vacuum-cleaner to remove excessive dirt from the floor 46.

As an alternative to asking and possibly paying the present-client 14 to remove or otherwise clean-up the object 16, the system 10 may request and optionally pay the present-client 14 for agreeing to additional travel time so the automated-taxi 12 can make a stop at the cleaning-facility 58 where others (not shown, other than the clients) are located and whose job it is to clean the automated-taxi 12. That is, the system 10 may include an embodiment of the cleaning-facility 58 that is staffed with employees of a company that maintains the automated-taxi 12. Accordingly, the cleaning-request 50 may include an offer 52 to reduce a fare paid by the present-client 14 for transportation by the automated-taxi 12 in exchange for an agreement 62 by the present-client 14 to allow a detour of the automated-taxi 12 to the cleaning-facility 58.

Even though the system 10 is generally equipped/configured to identify instances of the object 16 that need to be removed and/or cleaned for continued enjoyable and/or safe transportation of clients, there may be instances when the perception-sensor 20 is unable to detect the object 16 or something that needs to be fixed. For example, the perception-sensor 20 may not be able to detect that one of the seats 44 is loose, or that something is spilled under one of the seats 44 out of view of the perception-sensor. Therefore, the automated-taxi 12 may be equipped with some means for the present-client 14 to report that the automated-taxi 12 needs cleaning. To this end, the system may include an input-device such as a keyboard, a touch-screen, and/or a transceiver to receive message from smart-phone operated by present-client 14. The input-device 64 may be part of the communication-device 22, or may be a separate independent device. For example, if the communication-device is only a speaker, the input-device may be a smart-phone whose operation is generally independent from the operation of the speaker. In general, the input-device 64 is operable by the present-client 14 to report (i.e. file a service-report 66) that the automated-taxi 12 needs service such as cleaning and/or repair.

It is recognized that some people are inherently untidy or just don't care if they leave trash for others to take care of, i.e. are slobs, and are likely to leave trash in the automated-taxi, so the system 10 may also be configured to keep track of clients who leave trash. To this end, the system 10 may include a client-list 68 that documents that the object 16 was left by a prior-client 18. The identity of the prior-client 18 may be known if the automated-taxi 12 is charging fares to ride the automated-taxi 12. Otherwise, facial recognition may be used to determine the identity of the prior-client 18. It may be advantageous to all other clients who use the automated-taxi 12 if the prior-client 18 is banned from riding the automated-taxi 12 if the prior-client 18 has a history of prior incidents of leaving trash in the automated-taxi 12. Accordingly, the controller-circuit 30 may be configured to reject a transportation-request 40 from the prior-client 18 in response to a determination that the prior-client 18 has left one or more objects 16 in the automated-taxi 12 more than an occurrence-threshold 70 number of times, e.g. five (5) times. For example, the automated-taxi 12 may, for example, by-pass a location where the prior-client 18 (who is banned) is waiting to be picked up. Prior to banning the prior-client 18, the system 10 may send a warning-notice and/or affine or a bill to the prior-client 18 in response to the prior instances of the prior-client 18 leaving trash in the automated-taxi 12. It is contemplated that the value of the occurrence-threshold 70 may be adjusted (i.e. increased) of the prior-client 18 is a frequent and/or long-time customer of the automated-taxi 12.

Figure 3:
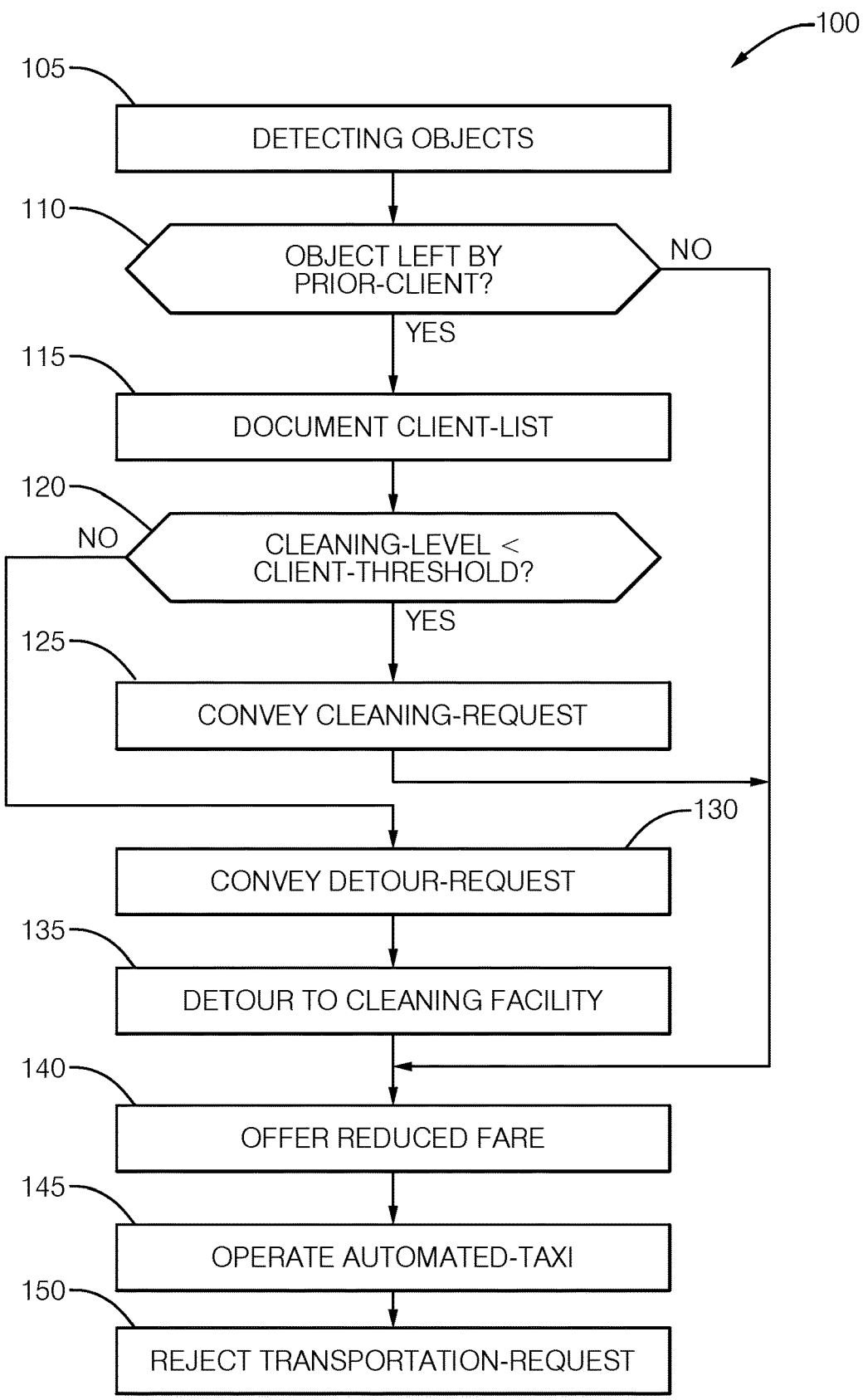
FIG. 3 is a method of operating the system of FIG. 1 in accordance with one embodiment.

FIG. 3 illustrates a non-limiting example of a method 100 for keeping an automated-taxi 12 clean.

Step 105, DETECTING OBJECT(S), may include detecting, with a perception-sensor 20, an object 16 aboard an automated-taxi 12. The boarding and seating or standing position of the prior-client 18 on the automated-taxi 12 may be tracked using data/information from the perception-sensor and known target tracking algorithms known to those in the autonomous vehicle operation arts. That a new target appears either because the prior-client 18 drops or tosses the object away from his/her body, or is left behind when the prior-client 18 exits the automated-taxi is also detected using those same algorithms.

Step 110, OBJECT LEFT BY PRIOR-CLIENT?, may include determining that an object 16 was left by a prior-client 18 of the automated-taxi 12 at about the moment the prior-client 18 exits the automated-taxi 12. It is contemplated that the object 16 may be detected before the prior-client 18 is off-board or has entirely exited the automated-taxi 12, and the system 10 may convey a reminder or request to the prior-client 18 that he/she has left behind the object 16. For example, the communication-device 22 may be a speaker and a voice message such as "please remove the personal item left behind on the floor" may be conveyed to the prior-client 18 as he/she approaches the door of the automated-taxi 12 when or just prior to reaching the destination of the prior-client 18.

Step 115, DOCUMENT CLIENT-LIST, may include documenting, i.e. storing in memory 34 or otherwise making a record of, the fact that that the object 16 was left by a prior-client 18. For example, when the prior-client 18 leaves the object 16, a counter of prior incidents associated with the identity of the prior-client may be incremented. Optionally, if the prior-client 18 subsequently travels on the automated-taxi 12 numerous times, e.g. more than ten times, without leaving any instance of the object 16 behind, the prior incidents counter may be decremented or reset to zero. It is also contemplated that the client-list 68 could include a video recording of the prior-client 18 leaving the object 16 so there is evidence of the event if later disputed by the prior-client 18.

Step 120, CLEANING-LEVEL<CLIENT-THRESHOLD?, may include identifying or classifying the object 16 as something that is safely and conveniently removed or cleaned by the present-client, or as something that should be brought to the attention by a professional. For example, if the object 16 is a paper bag that can be easily picked up by the present-client 14, or is a relatively small amount of dirt that can be quickly vacuumed by the present-client 14 making use of an on-board vacuum-cleaner, then the cleaning-level may low, e.g. be set to one (1), which is less than the cleaning-threshold which may be equal to two (2), so the method proceeds to step 125. However, if the object 16 is, for example, vomit or the result of spilling a large drink, the cleaning-level may be high, e.g. set to three (3), which may be something that the present-client 14 should not attempt to clean or remove, so the method proceeds to step 130.

Step 125, CONVEY CLEANING-REQUEST, may include, in response to determining the that the cleaning-level is less than the client-threshold, operating the communication-device 22 so the present-client 14 receives (e.g. hears and/or sees) the cleaning-request 50 to remove or clean the object 16. That is, step 125 may be characterized as conveying, with a communication-device 22, to a present-client 14, a cleaning-request 50 to remove the object 16 from the automated-taxi 12. It is contemplated that some instances of the present-client 14 may refuse or be unable to remove the object 16 for various reasons, so step 125 may be repeated to subsequent instances of clients, e.g. other persons who are designated by the system 10 as the present-client 14, until the object 16 is removed.

Step 130, CONVEY DETOUR-REQUEST, may include operating the communication-device 22 to convey a detour-request to the present-client to secure an agreement 62 from the present-client 14 to delay arriving at the destination 38 of the present-client 14 so the automated-taxi 12 can take the time to detour to an instance of the cleaning-facility 58 that is equipped with the necessary equipment to properly remove/clean the object. For example, if the object 16 is vomit or blood, it may not be desirable for the present-client 14 to attempt remove or clean the object 16.

Step 135, DETOUR TO CLEANING-FACILITY, may include, in response to receiving the agreement 62, detouring or deviating from the optimum or preferred route to the destination 38 to the cleaning-facility 58, and possibly stopping for some time at the cleaning-facility. The cleaning-facility 58 may have other instances of the automated-taxi 12 that are ready for use, so rather than having the present-client 14 wait for the automated-taxi he/she was riding to be cleaned, the present-client 14 may be directed board a different instance of the automated-taxi 12 to avoid any further delay.

Step 140, OFFER REDUCED FARE, is an optional step that may include offering to reduce a fare paid by the present-client for transportation by the automated-taxi in exchange for removing the object, and/or cleaning the automated-taxi, and/or an agreement by the present-client to allow a detour of the automated-taxi to a cleaning-facility. That is, it may not be necessary to offer the reduced-fare 54 to sufficiently incentivize the present-client 14 to remove or clean the object 16.

Step 145, OPERATE AUTOMATED-TAXI, may include operating the vehicle-controls 24 to drive the automated-taxi 12 to a destination of the present-client 14. The means and algorithms for autonomous or driverless operation of a vehicle such as the automated-taxi 12 are well-known and not described in any detail herein.

Step 150, REJECT TRANSPORTATION-REQUEST, may include rejecting a transportation-request 40 from the prior-client 18 in response to a determination that the prior-client 18 has left objects in the automated-taxi 12 more than an occurrence-threshold 70 number of times, e.g. five (5) times. The rejection of the transportation-request 40 may be by way of sending to the prior-client 18 a text or e-mail message indicating that the transportation-request 40 has been rejected, and the reasons for the rejection. Otherwise, if the prior-client 18 tries to board the automated-taxi 12 at a pick-up kiosk as part of a group of clients, the system 10 may, by way of the communication-device 22, e.g. the speaker, request that the prior-client 18 leave the automated-taxi 12, keep the automated-taxi 12 waiting until the prior-client 18 does get off or out of the automated-taxi 12, and/or notify law enforcement that the prior-client 18 is banned and needs to be removed from the automated-taxi 12

Described herein is a first device 30 that includes one or more processors 32; memory 34; and one or more programs 105-150 stored in memory 34. The one or more programs 105-150 including instructions for performing all or part of the method 100. Also, described herein is a non-transitory computer-readable storage-medium 34 that includes one or more programs 105-150 for execution by one or more processors 32 of a first device 30, the one or more programs 105-150 including instructions which, when executed by the one or more processors 32, cause the first device to perform all or part of the method 100.

Accordingly, a system 10 for keeping the automated-taxi 12 clean, a controller 30 for the system 10, and a method 100 of operating the system 10 are provided. Instances when a person (the prior-client 18) leaves trash or otherwise soils the automated-taxi 12 are responded to by requesting that some other person (the present-client 14) help to maintain the cleanliness of the automated-taxi 12. This avoids having other subsequent clients be dissatisfied with the transportation experience due to the automated-taxi being dirty, and encourages all clients to do their part to keep the automated-taxi 12 clean.

While this invention has been described in terms of the preferred embodiments thereof, it is not intended to be so limited, but rather only to the extent set forth in the claims that follow.

We claim:

1. A system for keeping an automated-taxi clean, said system comprising:
   at least one perception-sensor operable to detect a prior-client, a present-client, and an object that is associated with the prior-client aboard an automated-taxi;
   a communication-device operable to communicate with the present-client of the automated-taxi; and
   a controller-circuit in communication with the at least one perception-sensor and the communication-device, said controller-circuit configured to:
   track, with the at least one perception-sensor, the prior-client and the object aboard the automated-taxi;
   detect, with the at least one perception-sensor and based on a first track of the prior-client and a second track of the object, that the prior-client leaves the automated-taxi and the object remains aboard the automated-taxi;
   detect, with the at least one perception-sensor and based on a third track of a present-client, that the present-client enters the automated-taxi;
   detect, with the at least one perception sensor based on the second track of the object and the third track of the present-client that the present-client and the object are aboard the automated-taxi after the prior-client has left the automated-taxi;
   operate the communication-device to convey to the present-client a cleaning-request to remove the object from the automated-taxi.

2. The system in accordance with claim 1, wherein the cleaning-request includes an offer to reduce a fare paid by the present-client for transportation by the automated-taxi in exchange for removing the object.

3. The system in accordance with claim 1, wherein the system includes a cleaning-station equipped with a cleaning-device, and the cleaning-request includes an offer to reduce a fare paid by the present-client for transportation by the automated-taxi in exchange for cleaning the automated-taxi.

4. The system in accordance with claim 1, wherein the system includes a cleaning-facility and the cleaning-request includes an offer to reduce a fare paid by the present-client for transportation by the automated-taxi in exchange for an agreement by the present-client to allow a detour of the automated-taxi to the cleaning-facility.

5. The system in accordance with claim 1, wherein the system includes a client-list that documents that the object was left by a prior-client, and the controller-circuit is configured to reject a transportation-request from the prior-client in response to a determination that the prior-client has left objects in the automated-taxi more than an occurrence-threshold number of times.

6. The system in accordance with claim 1, wherein the system includes an input-device operable by the present-client to report that the automated-taxi needs service.

7. The system in accordance with claim 1, wherein the system includes vehicle-controls operable to drive the automated-taxi, the controller-circuit is in communication with the vehicle-controls, and the controller-circuit is configured to operate the vehicle-controls to drive the automated-taxi to a destination of the present-client.

8. A controller-circuit for keeping an automated-taxi clean, said controller-circuit comprising:
   an input configured to communication with at least one perception-sensor that is operable to detect a prior-client, a present-client, and an object that is associated with the prior-client aboard an automated-taxi;
   an output configured to communication with a communication-device operable to communicate with the present-client of the automated-taxi; and
   a processor in communication with the at least one perception-sensor via the input and the communication-device via the output, said processor configured to:
   track, with the at least one perception-sensor, the prior-client and the object aboard the automated-taxi;
   detect, with the at least one perception-sensor and based on a first track of the prior-client and a second track of the object, that the prior-client leaves the automated-taxi and the object remains aboard the automated-taxi;
   detect, with the at least one perception-sensor and based on a third track of a present-client, that the present-client enters the automated-taxi;
   detect, with the at least one perception sensor based on the second track of the object and the third track of the present-client that the present-client and the object are aboard the automated-taxi after the prior-client has left the automated-taxi;
   operate the communication-device to convey to the present-client a cleaning-request to remove the object from the automated-taxi.

9. The controller-circuit in accordance with claim 8, wherein the cleaning-request includes an offer to reduce a fare paid by the present-client for transportation by the automated-taxi in exchange for removing the object.

10. The controller-circuit in accordance with claim 8, wherein the cleaning-request includes an offer to reduce a fare paid by the present-client for transportation by the automated-taxi in exchange for cleaning the automated-taxi with a cleaning-device from a cleaning-station.

11. The controller-circuit in accordance with claim 8, wherein the cleaning-request includes an offer to reduce a fare paid by the present-client for transportation by the automated-taxi in exchange for an agreement by the present-client to allow a detour of the automated-taxi to a cleaning-facility.

12. The controller-circuit in accordance with claim 8, wherein the controller-circuit is configured to access a client-list that documents that the object was left by a prior-client, and the processor is configured to reject a transportation-request from the prior-client in response to a determination that the prior-client has left objects in the automated-taxi more than an occurrence-threshold number of times.

13. The controller-circuit in accordance with claim 8, wherein the controller-circuit is configured to communicate with an input-device operable by the present-client to report that the automated-taxi needs service.

14. The controller-circuit in accordance with claim 8, wherein the controller-circuit is configured to operate vehicle-controls to drive the automated-taxi to a destination on of the present-client.

15. A method for keeping an automated-taxi clean, said method comprising:
   detecting, with at least one perception-sensor based on a first track of a prior-client and a second track of an object that is associated with the prior-client, the prior-client and the object aboard an automated-taxi, wherein the object is associated with the prior-client;
   detecting, with the at least one perception-sensor and based on the first track of the prior-client and the second track of the object, that the prior-client has left the automated-taxi and the object has remained aboard the automated-taxi;
   detecting, with the at least one perception-sensor and based on the a third track of a present-client, that the present-client has entered the automated-taxi;
   detecting, with the at least one perception-sensor and based on the second track of the object and the third track of the present-client, that the present-client and the object are aboard the automated-taxi after the prior-client has left the automated-taxi;
   conveying, with a communication-device, to the present-client, a cleaning-request to remove the object from the automated-taxi; and
   operating, with a controller, the automated-taxi along a route based on a response to the cleaning-request by the present-client.

16. The method in accordance with claim 15, wherein the method includes offering to reduce a fare paid by the present-client for transportation by the automated-taxi in exchange for removing the object.

17. The method in accordance with claim 15, wherein the method includes offering to reduce a fare paid by the present-client for transportation by the automated-taxi in exchange for cleaning the automated-taxi.

18. The method in accordance with claim 15, wherein the method includes offering to reduce a fare paid by the present-client for transportation by the automated-taxi in exchange for an agreement by the present-client to allow a detour of the automated-taxi to a cleaning-facility; and
   detouring to the cleaning-facility.

19. The method in accordance with claim 15, wherein the method includes documenting that the object was left by a prior-client; and
   rejecting a transportation-request from the prior-client in response to a determination that the prior-client has left objects in the automated-taxi more than an occurrence-threshold number of times.

20. The method in accordance with claim 15, wherein the method includes operating vehicle-controls to drive the automated-taxi to a destination of the present-client.

* * * * *